May 22, 1956  H. J. SCHOLTZE  2,746,762
AXLE ALIGNMENT GUIDE IN DUAL AXLE UNDERCARRIAGES
Filed April 23, 1954  2 Sheets-Sheet 1

INVENTOR.
HERMAN J. SCHOLTZE
BY
ATTORNEY

May 22, 1956  H. J. SCHOLTZE  2,746,762
AXLE ALIGNMENT GUIDE IN DUAL AXLE UNDERCARRIAGES
Filed April 23, 1954  2 Sheets-Sheet 2

INVENTOR.
HERMAN J. SCHOLTZE
BY
ATTORNEY

United States Patent Office 2,746,762
Patented May 22, 1956

2,746,762

AXLE ALIGNMENT GUIDE IN DUAL AXLE UNDERCARRIAGES

Herman J. Scholtze, Berkeley, Calif., assignor to F. A. B. Manufacturing Company, Inc., Emeryville, Calif., a corporation of Nevada Application April 23, 1954, Serial No. 425,088

7 Claims. (Cl. 280—104.5)

This invention relates generally to dual axle undercarriage units for vehicular trucks and has particular reference to axle alignment guides for such undercarriage units. The exemplification of the invention described and illustrated herein relates the invention to such undercarriages employed in trailer vehicles, since the power units of the vehicle are not involved in the invention.

Dual axle undercarriages are usually employed in extra long vehicular truck units of non-power trailer units of trucking vehicles in which it is desired to spread the gross weight of the vehicle over a large area of roadway by means of a plurality of wheels such as in the logging industry or trucking of long heavy loads of pipe, steel beams and the like, the dual axles of the undercarriage being longitudinally spaced and parallel in the undercarriage truck unit. These spaced axles are usually connected by a leaf spring between them at each side and suitably trussed diagonally between the springs and axles.

Because of the flexure of the spring due to vibration from uneven road surfacing and the varying stresses of vertical vibration, and horizontal torque and whip in axles and wheels which are thus spaced and supported, it is desirable that the diagonal thrust of the spaced axles be provided with a degree of vertical movement as well as a degree of horizontal swing or give. Such vibration and torsion under constant running conditions tends to relatively misalign the parallel dual axles and the wheels, which obviously causes excessive strain on the undercarriage structure and unduly wears the tread of the tires. To eliminate or minimize these undesirable factors by axle aligning means is the purpose of this invention.

Briefly described, the invention assumes a well known undercarriage unit having a pair of parallel axles relatively longitudinally spaced, springs at opposite sides of the undercarriage connecting or at least bearing on such axles, diagonal torsional trusses between the axles and suitable traction facilities such as wheels, brakes and the like. The structure of the invention in such combination of facilities, comprises an adjustable resilient snubber block mounted on each of the opposite ends of each axle, and the opposed snubber blocks at each side of the undercarriage being suitably buttressed between the axles by a metal snubber bar or strip underlying the leaf springs at each of the opposite sides of the undercarriage, the adjustment means being a pair of lockable jack bolts at each end of each bar which exert pressure against the snubber blocks.

A preferred form in which the invention may be embodied is described herein and illustrated in the accompanying drawing in which.

Figure 1:
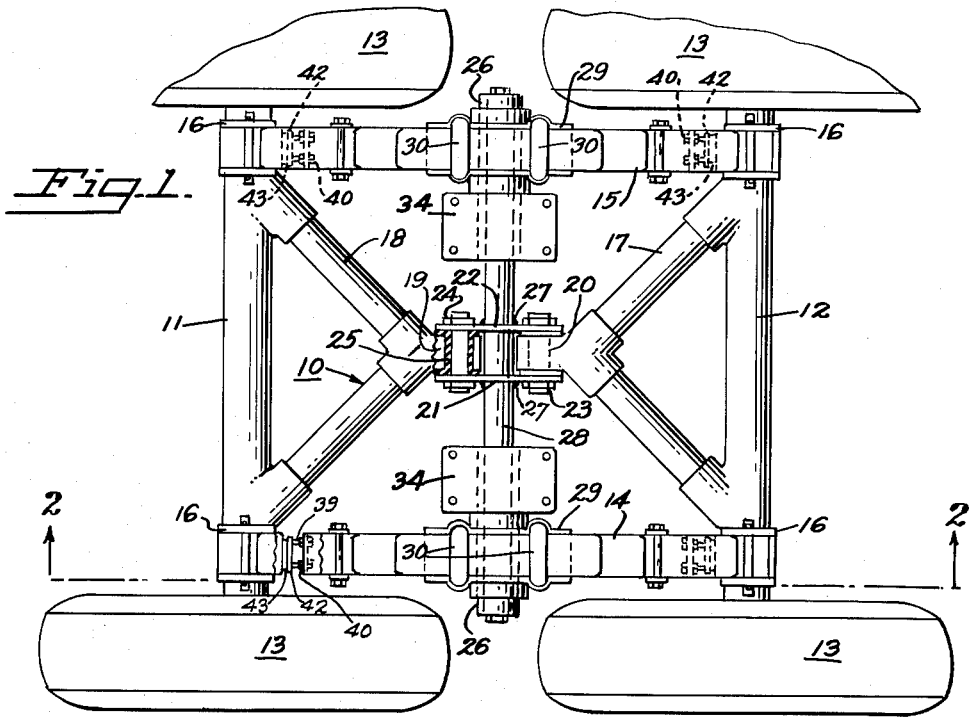
Fig. 1 is a fragmentary plan view of an undercarriage, having a portion of a leaf spring broken away to show the location and general application and structure of the invention.
Figure 2:
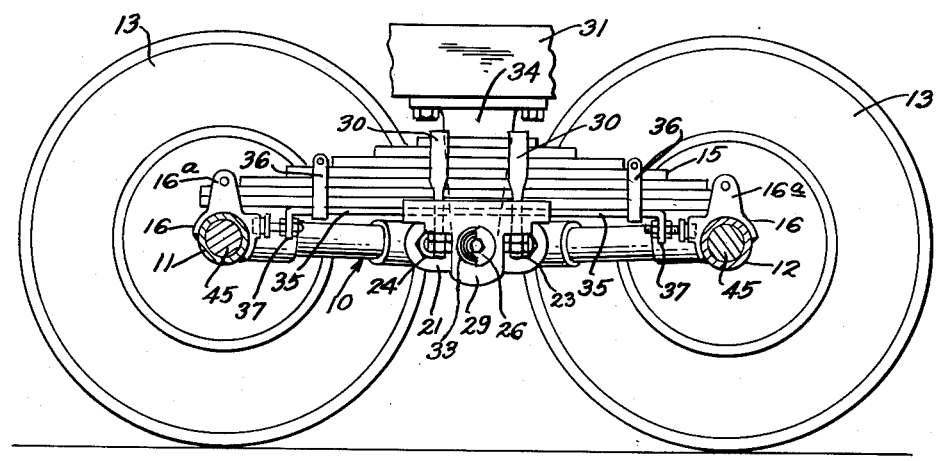
Fig. 2 is a side elevation on line 2—2 of Fig. 1.
Figure 3:
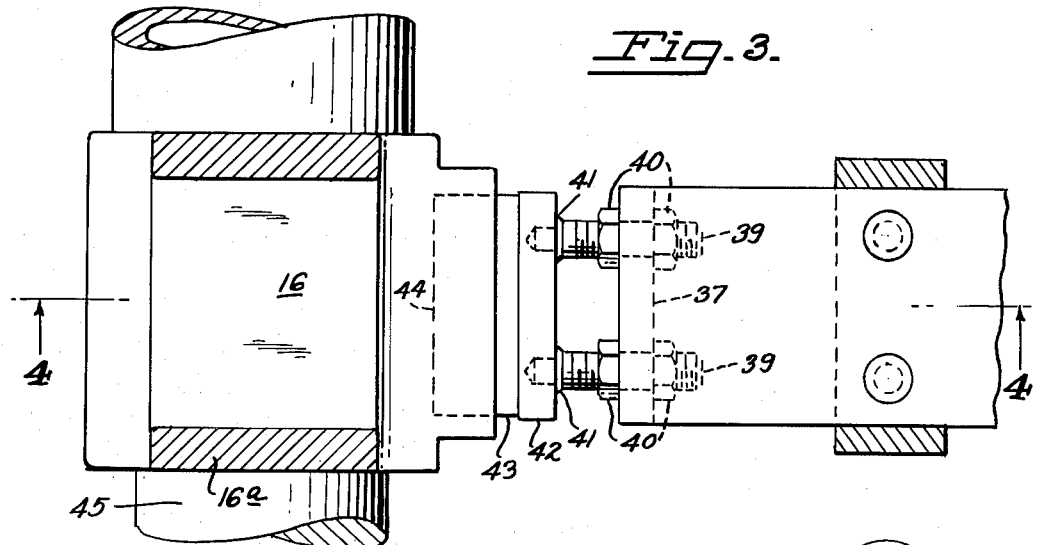
Fig. 3 is an enlarged fragmentary plan view of detail structure of aligning means of the invention on line 3—3 of Fig. 4.
Figure 4:
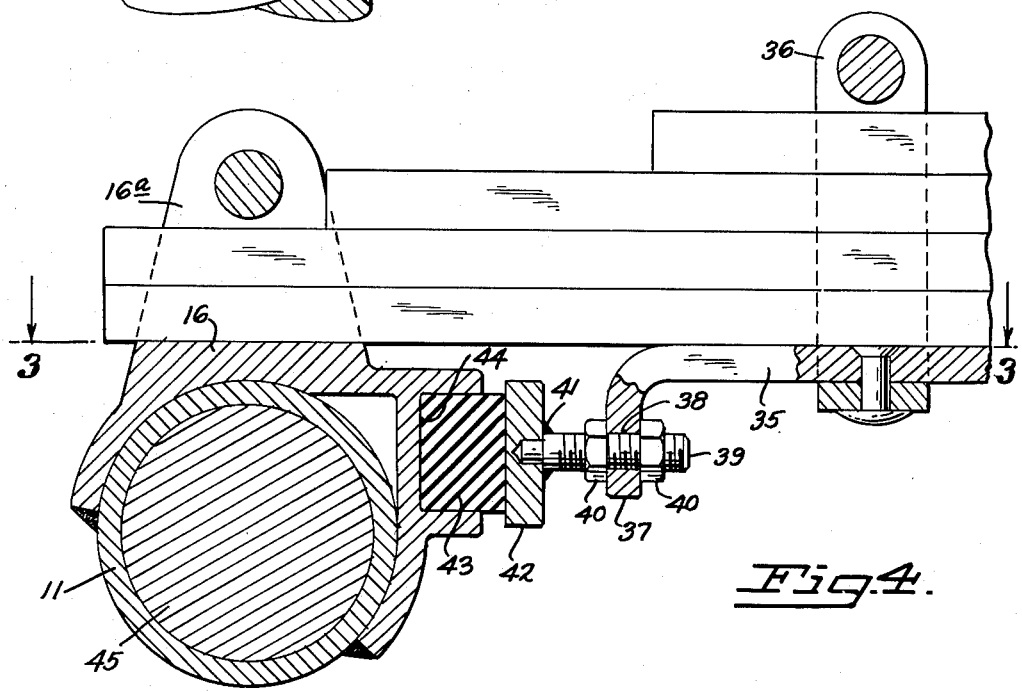
Fig. 4 is an enlarged fragmentary side elevation partly in section on line 4—4 of Fig. 3.

Referring to the drawings in which like reference characters indicate corresponding parts in the several views, 10 indicates generally the frame of running gear for an undercarriage truck unit, providing a pair of relatively longitudinally spaced and parallel hollow axle housings 11 and 12 for housing therein suitable wheel axles designated 45, which mount the usual wheels 13 at the opposite ends.

The parallel axle housings are relatively spaced longitudinally at the opposite ends of leaf spring assemblies 14 and 15 which extend therebetween at each side of the undercarriage, the ends of the spring being supported on the axle housings by spring seat members 16 which may be welded to and thereby made integral with the axle housing, the spring seat members having upstanding walls providing shackle brackets 16a within which the ends of the springs are held.

Each of the spring seat members is provided with a socket 44 which underlie the several end portions of the leaf springs, the openings of the sockets at each side of the undercarriage being relatively opposed, the purpose of which will be further described.

The frame is trussed diagonally between the axle housings by a pair of preferably tubular Y-shaped yokes which space the axle housings longitudinally, the diverging legs 17, 18 of the yokes being connected to the opposite end portions of the respective axle housings adjacent the ends of the springs 14, 15. The stems 19, 20 of the Y yokes extend toward each other. The respective stems are engaged between the opposite ends of spaced plates 21, 22 by means of bolts 23, 24, upon which the stems are pivotally mounted for vertical movement of the opposite ends of the legs of the yokes to accommodate vertical vibration of the axle housings from the spring action.

Between the yoke stems 19, 20 and the bolts 23, 24 which pass therethrough there are resilient tubular packings of densely packed or compressed rubber having a metal bushing therearound and collectively indicated 25, permitting a sufficient degree of resilience to accommodate the horizontal torque at the terminal ends of the legs of the yokes and the axle housing to which said legs are rigidly connected.

The plates 21, 22 are secured tightly as by welding 27 upon a preferably tubular transverse load shaft 28 which is longitudinally midway between and parallel to the axles, the shaft extending through said plates and oppositely therefrom beyond the leaf springs 14, 15, so that the opposite end portions of the shaft underlie the longitudinally central portion of the springs 14, 15, each opposite end portion of the tubular shaft being closed by a cap and nut 26. The opposite end portions of the load shaft are tightly engaged in and supported by spring saddles 29 in which the longitudinally central portions of the spring assemblies seat, the saddles being secured to the spring assemblies by shackle straps 30. The shaft 28 may also have a tubular collar 33 of densely packed or compressed rubber between it and the saddle 29. The bed or body of the truck or trailer of which a fragment is shown at 31 is supported upon the shaft 28 by any suitable support indicated 34.

The adjustable axle alignment guides at the opposite sides of the undercarriage each comprise an elongated metal guide strip 35 underlying the lowermost and longest of the leaves of the springs in the spring assemblies 14, 15, the strips preferably being of substantially the same width as the leaves of the springs, and having the longitudinal central portion thereof supported in the seat of the spring saddle 29. Adjacently spaced from its opposite end portions each guide strip is held in its position underlying the spring leaves by securing it within the usual spring clips 36 which bind together the spring leaves intermediate the ends thereof. The guide strip need not necessarily be as thick as the leaves of the spring, since it is not intended as a load supporting factor, though it has sufficient resiliency to move with the flexure of the lowermost of the spring leaves. Each guide strip terminates at its opposite ends in adjacently spaced relation to the axles 11, 12, said ends of the guide strip being turned downwardly so as to depend away from the leaf spring to provide a rigid free flange 37. The downwardly flanged portions at each of the ends of the guide strips have openings 38 for receiving therethrough one end portion of threaded adjustment stud bolts 39, said bolts being advanced, retracted or locked at an adjusted position with relation to the flange by locknuts 40, one at each face of the downwardly turned flange. Two of such openings and bolts transversely adjacently spaced have been found sufficient at each end of the guide strip. The opposite ends of the stud bolts are fixedly secured, as by welding 41 to one face of a bumper or pressure plate 42, which has contact pressure at its opposite face against a resilient snubber block 43 such as densely packed or compressed rubber, the snubber block being mounted within the recessed sockets 44 in the walls of the spring seat members 16 at the opposite end portions of each of the tubular axles, said sockets and snubber blocks underlying the ends of the seated springs. It is noted that the flanges 37 provide a preferred form of fixed base or buttress against which is exerted the pressure of adjustment of stud bolts 39, and other forms of such bases may be substituted such as welding the flange 37 to the underface of the lowermost leaf of the spring.

It is to be understood that any suitable braking mechanism may be employed on the wheels of the undercarriage but is not believed necessary to illustrate or describe such mechanism other than to note that braking provides a torsional stress on the frame and running gear generally, making the axle aligning guide highly advantageous for maintaining wheel alignment.

By adjustment of the bumper plates 42 with relation to the resilient body 43 by means of stud bolts 39 the axles 11, 12 may be finely and accurately adjusted and the torque minimized in the dual axles, whereby the tread of the wheels may be maintained in alignment even though there may be vibrations from uneven road surfaces and severe stresses from torque on the dual axles from braking on the traction wheels or turning and swing of the rear end of a long vehicle.

Having thus described the invention, what is claimed as new and patentable is:

1. A dual axle undercarriage truck for vehicles comprising a frame of running gear including a pair of longitudinally spaced and parallel axles for supporting suitable traction wheels at opposite ends thereof, truss means extending diagonally between said axles for maintaining the relative parallel spacing thereof, a leaf spring assembly at each opposite side of the frame extending between and seated on the axles, a load shaft extending laterally transversely across the frame centrally intermediately between and parallel with the axles and having its opposite end portions connected to the longitudinally central portions of the springs, said truss means being pivotally connected to said shaft, and an axle alignment means including a rigid downwardly disposed buttress flange depending below and adjacent to each end of the spring assemblies and adjacently spaced from the axles, stud bolts having one end adjustably mounted through said flanges, lock nuts on said bolts for locking the bolt relative to the flanges, a bumper plate connected to the opposite end of each of said bolts, and a resilient snubber block between each of said bumper plates and the adjacent ends of the axles, said snubber blocks being connected to the axle housings.

2. An undercarriage truck for vehicles having the elements of claim 1 and in which said axles each has at its opposite ends a socket and the resilient snubber block is mounted therein, and the said bumper plate bears against the resilient snubber block responsive to pressure of the stud bolt.

3. An undercarriage truck for vehicles having the elements of claim 1 and in which the axle alignment means includes a guide strip underlying each of the leaf spring assemblies and terminating at each end in adjacently spaced relation to the axles, the buttress flanges depending downwardly from opposite ends of the guide strips and receiving the stud bolt therethrough.

4. An undercarriage truck for vehicles having the elements of claim 1 and in which the axles each has at its opposite ends a socket, the resilient snubber block being mounted therein, and the axle alignment means includes a guide strip underlying each of the leaf spring assemblies and extending in opposite directions from the longitudinal central portions of the spring asemblies toward the opposite ends thereof and terminating in spaced relation to the axles, said downwardly disposed flanges depending from the opposite ends of said guide strips and adjacently spaced from the axle, the stud bolts being adjustably mounted through said flanges.

5. In a dual axle undercarriage truck for vehicles having a frame of running gear including a pair of longitudinally spaced and parallel axles for supporting suitable wheels at opposite ends thereof, with diagonal thrust means extending between said axle housings maintaining the spacings thereof, and leaf spring assemblies at opposite sides of the frame and longitudinally extending between the axles and bearing thereon at opposite end portions of the respective axles, and a load shaft extending laterally transversely across the frame intermediately between and parallel with the axles and having its opposite end portions connected to the longitudinally central portion of the springs, the truss means being pivotally connected to the central portion of said shaft and extending therefrom to the ends of the axles, the combination therewith of an axle alignment means having rigid flanges depending downwardly adjacent to each of the opposite ends of the leaf spring assemblies, said flanges being adjacently spaced from the axles, stud bolts adjustably mounted through openings in said flanges and lock nuts on said bolts, the end of said bolts adjacent to the respective axles having a bumper plate, and resilient snubber blocks carried by the axle housings and interposed in contact between said bumper plates and the adjacent ends of the axles.

6. In an undercarriage truck for vehicles having the combination defined in claim 5 and in which said axles each has at is opposite ends a socket and the resilient snubber block is mounted therein.

7. In an undercarriage truck for vehicles having the combination of elements defined in claim 5 and in which the axles each has at its opposite ends a socket and the resilient snubber block is mounted therein, and the axle alignment means includes a guide strip which underlies each of the leaf spring assemblies and terminates in adjacently spaced relation to the axles, the said downwardly disposed flanges depending from the opposite ends of the guide strips and the stud bolts passing through said flanges.

References Cited in the file of this patent

UNITED STATES PATENTS

| | | |
|---|---|---|
| 1,912,308 | Rayburn | May 30, 1933 |
| 1,913,698 | Clement | June 13, 1933 |